Oct. 14, 1930.  F. E. BRUCE  1,778,352
WOOD FLOORING
Filed April 14, 1928  2 Sheets-Sheet 1
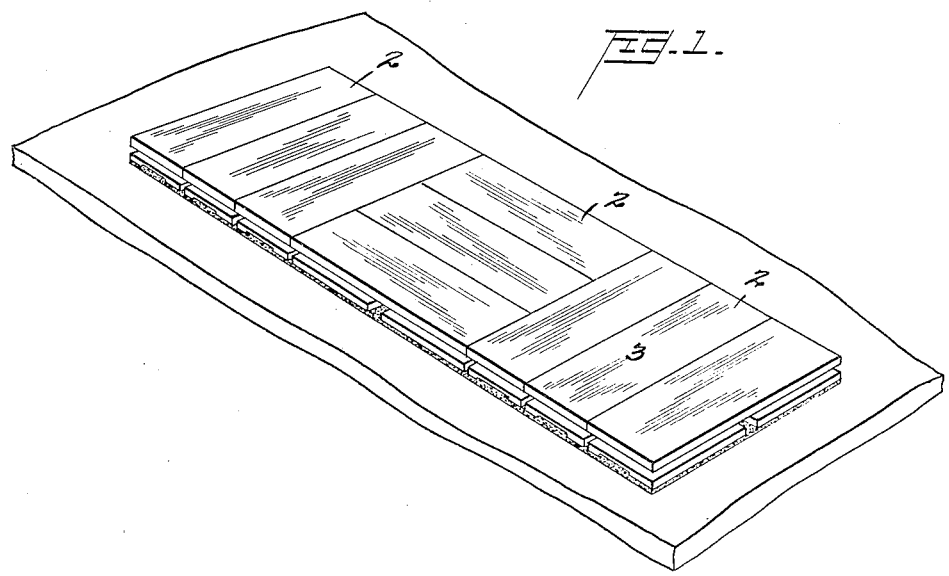
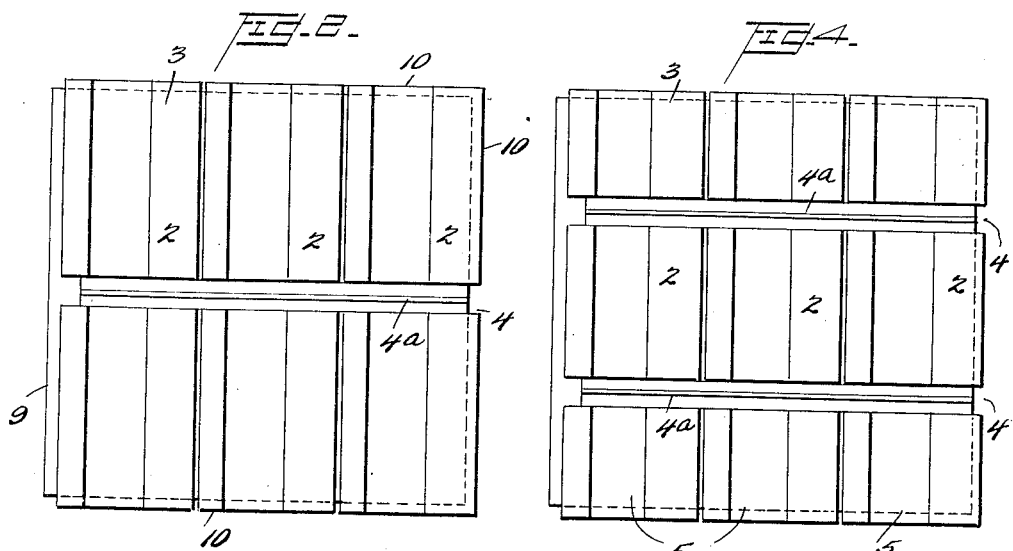
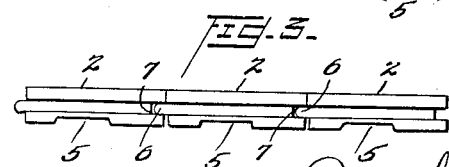
Inventor
Frank E. Bruce
By John Boyle Jr
Attorney

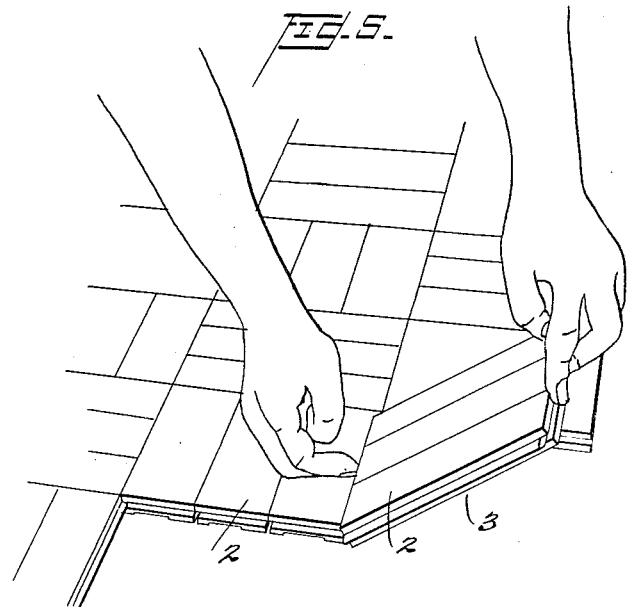
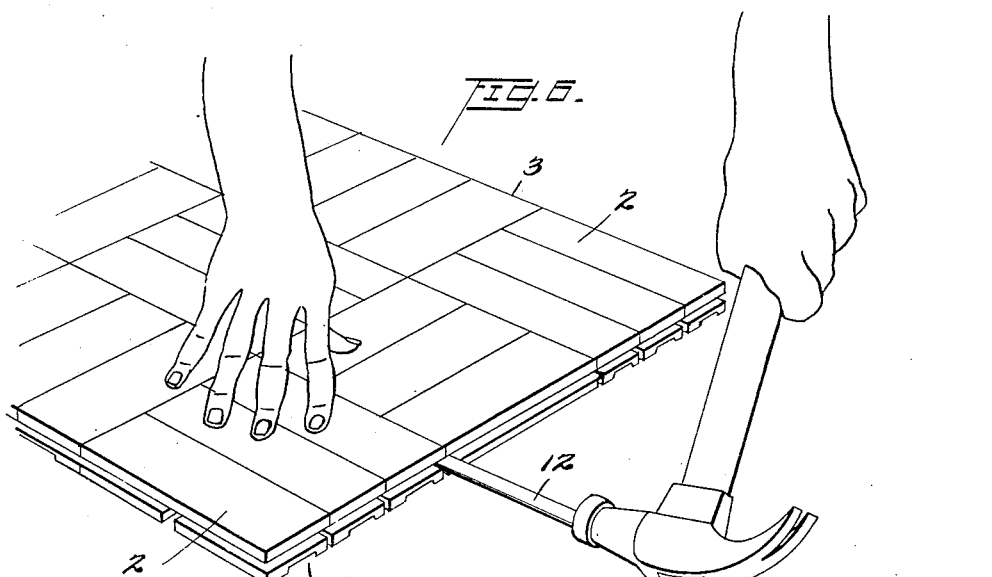

Patented Oct. 14, 1930

1,778,352

UNITED STATES PATENT OFFICE

FRANK E. BRUCE, OF MEMPHIS, TENNESSEE, ASSIGNOR, BY MESNE ASSIGNMENTS, TO CELLIZED OAK FLOORING, INC., OF MEMPHIS, TENNESSEE, A CORPORATION OF DELAWARE

WOOD FLOORING

Application filed April 14, 1928. Serial No. 270,059.

My invention relates to flooring and has particularly in view improvements in the manufacture and method of laying wood block floors. I take short pieces of flooring which would otherwise be waste or of small value and form out of them unitary blocks made up of a plurality of suitably joined pieces. These blocks are then laid in place, without the use of nails, by employing a plastic cement between the blocks and sub-floor.

Referring to the drawings for a more complete disclosure of the invention:

Fig. 1 is a perspective view of a portion of the floor, showing the sub-floor in cross-section;

Fig. 2 is a bottom plan view of one of the types of wood blocks;

Fig. 3 is an end elevation of Fig. 2;

Fig. 4 is a bottom plan view of a modified type of blocks; and

Figs. 5 and 6 are views showing the method of laying the blocks.

The pieces of wood 2 which form the blocks 3 having been cut to the desired lengths are assembled in one unit, a plurality of pieces being placed edge to edge, said pieces being held together in any suitable manner, a preferred form for locking the pieces of wood together being disclosed in the application for patent of C. W. Allen, Serial No. 198,085, filed June 11, 1927, and comprising the use of a steel spline 4ª forced into a groove 4 running transversely of the bottom of the block.

Prior to or after assembling the pieces of wood to form the blocks, they are subjected to a treatment to render them resistant to moisture absorption.

The groove 4 is cut across the grain of the pieces of wood 2, preferably before assembling the pieces to form the block and the wood is subjected to the water-proofing treatment, preferably after the pieces have been assembled to form the block.

The individual pieces of wood 2 which make up the block 3 may be provided with the customary shallow groove or "hollow back" 5 running lengthwise of the strip. The pieces of wood may be joined together to form the block by means of integral tongues 6 and grooves 7 on adjacent pieces. Along this junction line the relief 8 may be provided, said relief being a groove that is formed because the width of the back face of each flooring piece is slightly less than the face width. The purpose of the relief in ordinary flooring is to insure a tight joint at the surface, to take up the dirt or other foreign matter that might accumulate between the pieces during laying and also to provide an expansion joint, in case the flooring absorbs moisture from the underside, and expands there as a result of that moisture.

While it may be desirable to have present in the finished block, the transverse groove 4, the hollow back 5 and the relief 8, some of these grooves may be dispensed with without affecting the scope of the invention.

The fabricated moisture repellant block 3 is laid in place on a wooden or solid concrete or any hard subflooring 9 and is held in position by means of a waterproof bituminous tar-like plastic cement 10, which is preferably of a non-setting type. Where a non-setting plastic cement is used, the floors may be easily realigned, or when the floor is subjected to unusually hard wear, units or pieces may be removed and replaced without trouble.

By making the wood of the blocks moisture resistant, the units may be laid with the plastic waterproof cement directly over solid concrete that is not thoroughly dry, over wood subfloors that are not as dry as the block flooring itself, which is usually kiln dried, and over other types of subfloors that are not or will not dry out for a considerable length of time after laying. The plastic cement should be water repellant and accordingly will balance the final finish, on the surface of the floor, which is also water repellant. Much of the trouble with wood flooring due to warping and cupping arises from the unbalanced moisture conditions of the surface with respect to the back of the flooring.

In laying the blocks with the plastic cement, it is warmed up sufficiently to make it workable. This can be done by heating the cement in an open vessel over a heater to a temperature of about 225° F. If temperatures are too low, the cement becomes too heavy, which retards the ease of laying and produces too thick a coating. On the other hand, if the temperature of the cement is too high, its necessary qualities will be destroyed through volatization of the oils which give the cement its permanent plasticity.

The cement may be spread on the subfloor but preferably is applied to the underside of the block. Holding the block in a horizontal position, the operator dips the bottom into the hot cement to a depth of about an eighth of an inch. The block is then held in a vertical position to let the excess cement drain off. Turning the block into a horizontal position, the bottom side up, stops further draining and permits the adhering cement to flow evenly over the under surface.

Various methods may be used for laying the blocks. One satisfactory way is shown in Figs. 5 and 6. There the block 3 is held at an angle, until in proper position and then pressed down on the subfloor a little distance from its desired final position. The block is then pulled and slid into place by hand by a pressure applied horizontally and in the same plane as the floor. After the block is in proper position, a slip tongue 12 may be inserted into position as shown in Fig. 6.

As the blocks are usually laid with the grain running alternately with respect to the adjacent block 3, some blocks will be pulled into position, where the relief 8 and "hollow back" grooves 5 operate to distribute the cement. When a block is pulled into position across the relief 8 and groove 5, the plastic cement has a tendency to crowd up under the tongue or front side of the block. The similar open ended grooves on the under side of the adjacent block will relieve this condition in part by providing an outlet for excess cement. The transverse groove 4 functions in the same manner when the block is pulled into place and the groove at the time of placement is cutting across the direction of pull. Such a grooved block pulls into place more easily than does a flat or ungrooved block. By pulling the blocks into place, they go very fast, very neatly, and very easily. In addition, the grooves in the blocks operate in the manner of laying to spread the cement more evenly on the subfloor.

For securing the fabricated blocks together to form the floor, any one of various tongue and groove connections may be employed. That shown comprises an integral tongue 9 on one side of the block and grooves 10 on the other three sides. For connecting the blocks together where the groove in one block is opposite the groove in the other block, slip tongues 12 will be employed.

When the floor is completed, the plastic cement may invade the cross groove 4, the hollow back 5 and the relief 8 to an extent depending upon how much of the cement is present. Unless means is provided to take care of the excess cement when the floor is pressed down by heavy bodies, either at the time of laying or continuously thereafter, then it will be forced up between the individual pieces and appear on the surface of the floor. The grooves 4, cut across the usual small reliefs 8 and the hollow backs 5 provide an interconnected system in the block to adequately take care of excess cement.

In order for the blocks to adhere properly, it is desirable to have only a thin section of the plastic cement between the under face of the block and the subfloor. It is impossible under all conditions to get this thin body of cement unless some means is provided in the block to take care of the excess cement, as the blocks are pressed down finally by the floor layer and subsequently by the heavy bodies that are placed thereon.

The provision of a groove or grooves in the backs of the blocks decreases the bearing surface which rests on the subfloor as compared to a flat block. This is an important factor in a block having a substantial area because a projection or unevenness in the subfloor will rock the block to a substantial degree. The decreased bearing surface accordingly diminishes the possibilities of this rocking, in proportion to the decreased bearing surface. In a small section of flooring, such as a single strip, this is not so important and the necessity for a grooved underside is not so compelling.

There are very decided advantages in laying waterproofed blocks in plastic cement directly over solid concrete. Heretofore, in the laying of floors over concrete, it was first necessary to lay wooden screeds on the concrete subfloor, a wood subfloor being supported on the screeds. To the subfloor was then nailed the regular strip flooring. By laying the treated blocks directly over concrete with a cement, there is saved the material and labor cost of screeds, floor fasteners, cinderfill, or other type of fill, and subfloor. This permits of the use of lighter steel beams to support the floors. It is possible, therefore, with the same head room, to reduce the height of a story from 2½ to 3⅜ inches, which becomes a very important factor in buildings of many stories.

By laying the fabricated block in a cement that is plastic at the time of laying or thereafter, a more easy alignment or adjustment of patterns is effected than when the individual pieces are so laid.

When the floor is laid in a non-setting plastic cement, the adhering compound is to a large extent capable of producing an air-tight joint so that with a downward pressure of bodies on the floor, suction keeps the floor more firmly affixed to the compound and to the subfloor.

The plastic cement thoroughly laminates the blocks with the concrete and also acts as a sound deadener.

The cross-groove 4 will be comparatively small and in a block that is 6¾ths inches square, the groove will be ½ of an inch in width and ⅜ths of an inch in depth.

While I have disclosed the use of splines 4a in the cross-grooves 4, the splines may be omitted when other means are employed for holding the strips of the block together.

I am aware that my invention may be embodied in other specific forms without departing from the spirit or essential attributes thereof, and I desire the present embodiment to be considered in all respects as illustrative and not restrictive, reference being had to the appended claims rather than to the foregoing description to indicate the scope of the invention.

Having thus described my invention, what I claim as new and desire to secure by United States Letters Patent is:

1. A floor formed of blocks composed of a plurality of pieces of wood united along their longitudinal edges by a tongue and groove, each piece having a hollow back, a relief groove between the pieces and on the underside of the said tongue and groove, and another groove on the underside of the block extending transversely of the hollow backs and relief grooves, a hard sub-floor on which the block is laid and a normally plastic cement interposed between the blocks and subfloor for securing the blocks to the subfloor, the said hollowbacks and grooves on the underside of the block substantially diminishing the contact area of the blocks and subfloor and providing an outlet for excess cement.

2. A floor formed of blocks composed of a plurality of pieces of wood united along their longitudinal edges by a tongue and groove, longitudinal and transverse grooves on the underside and intermediate the edges of the block, a hard subfloor on which the block is laid and a normally plastic cement interposed between the block and subfloor for securing the block to the subfloor, the said grooves on the underside of the block substantially diminishing the contact area of the blocks and subfloor and providing an outlet for excess cement.

3. A floor formed of blocks composed of a plurality of pieces of wood which have been impregnated with a water-repellant composition, each piece having a hollowback on its underside and intermediate its longitudinal edges, a hard subfloor on which the blocks are laid, a water-repellant finish on the face of the floor, and a waterproof normally plastic cement between the blocks and the subfloor for securing the blocks to the subfloor and adapted to balance the finish on the face of the floor, the said hollowbacks substantially diminishing the contact area of the blocks and subfloor and providing an outlet for excess cement.

4. A floor formed of blocks composed of a plurality of pieces of wood united along their longitudinal edges by a tongue and groove, each piece having a hollow back, a relief groove between the pieces and on the underside of the said tongue and groove and another groove on the underside of the block, extending transversely of the hollow backs and relief grooves, the said blocks being impregnated with a water repellant composition, a hard subfloor on which the blocks are adapted to be laid, a water-repellant finish on the face of the floor, and a waterproof, normally plastic cement between the blocks and the subfloor for securing the blocks to the subfloor and adapted to balance the finish on the face of the floor, the said hollow backs and grooves on the underside of the block substantially diminishing the contact area of the block and subfloor and providing an outlet for excess cement.

5. A floor comprising blocks united along their contacting edges by a tongue and groove and composed of a plurality of pieces of wood united along their longitudinal edges by a tongue and groove, each piece having a hollow back on its underside and intermediate its edges, a hard subfloor on which the block is laid and a normally plastic cement interposed between the block and subfloor for securing the block to the subfloor, the said hollow backs substantially diminishing the contact area of the blocks and subfloor and providing an outlet for excess cement.

6. A floor formed of blocks united along their contacting edges by a tongue and groove and composed of a plurality of pieces of wood united along their longitudinal edges by a tongue and groove, intersecting longitudinal and transverse grooves on the underside of and intermediate the edges of the block, a fastening device located in a transverse groove, a hard subfloor on which the block is laid and a normally plastic cement interposed between the block and subfloor for securing the block to the subfloor, the said grooves on the underside of the block substantially diminishing the contact area of the blocks and subfloor and providing an interconnecting outlet for excess cement, the said tongues and grooves inhibiting the passage of excess cement to the face of the floor.

7. A floor comprising blocks united along their contacting edges by tight holding joints and composed of a plurality of pieces of wood united along their longitudinal edges by tight holding joints, the said blocks having a plurality of grooves on their underside, a hard subfloor on which the blocks are laid and a normally plastic cement interposed between the blocks and subfloor for securing the blocks to the subfloor, the said grooves substantially diminishing the contact area of the blocks and subfloor and providing an outlet for excess cement, the said joints between the blocks and pieces preventing the passage of excess cement to the face of the floor and holding the blocks and pieces in assembled relationship.

8. A floor comprising blocks united along their contacting edges by tight holding joints, the said blocks having a plurality of grooves on their undersides parallel with one of the edges of the block, the grooves in adjacent blocks being at right angles to each other, a hard subfloor on which the blocks are laid and a normally plastic cement interposed between the blocks and subfloor for securing the blocks to the subfloor, the open ends of the grooves of the blocks providing a space for excess cement as the adjacent block is shoved into position, the said joints between the blocks preventing the passage of excess cement to the face of the floor and holding the blocks in assembled relationship.

In testimony whereof I affix my signature.

FRANK E. BRUCE.